United States Patent
Brant et al.

(10) Patent No.: US 10,899,632 B2
(45) Date of Patent: Jan. 26, 2021

(54) METHOD OF PRODUCING A SODIUM IRON(II)-HEXACYANOFERRATE(II) MATERIAL

(71) Applicant: ALTRIS AB, Gävle (SE)

(72) Inventors: William Brant, Uppsala (SE); Ronnie Mogensen, Uppsala (SE); Reza Younesi, Uppsala (SE); Féres Dehchar, Uppsala (SE)

(73) Assignee: ALTRIS AB, Gävle (CH)

(*) Notice: Subject to any disclaimer, the term of this patent is extended or adjusted under 35 U.S.C. 154(b) by 75 days.

(21) Appl. No.: 16/332,982

(22) PCT Filed: Sep. 21, 2017

(86) PCT No.: PCT/SE2017/050917
§ 371 (c)(1),
(2) Date: Mar. 13, 2019

(87) PCT Pub. No.: WO2018/056890
PCT Pub. Date: Mar. 29, 2018

(65) Prior Publication Data
US 2019/0270649 A1 Sep. 5, 2019

(30) Foreign Application Priority Data
Sep. 22, 2016 (SE) .................................. 1651252

(51) Int. Cl.
*H01M 4/00* (2006.01)
*C01G 49/00* (2006.01)
(Continued)

(52) U.S. Cl.
CPC .............. *C01G 49/009* (2013.01); *C01C 3/12* (2013.01); *H01M 4/587* (2013.01);
(Continued)

(58) Field of Classification Search
CPC .. H01M 4/5825; H01M 4/587; H01M 10/054; H01M 2004/028; C01G 49/009;
(Continued)

(56) References Cited

U.S. PATENT DOCUMENTS 9,546,097 B2 * 1/2017 Vail .......................... H01M 4/58
9,666,866 B2 * 5/2017 Wang ...................... H01M 4/58
(Continued)

OTHER PUBLICATIONS

Wang et al., "Rhombohedral Prussian White as Cathode for Rechargeable Sodium-Ion Batteries", J. Am. Chem. Soc. 137:2548-2554 (2015).
(Continued)

*Primary Examiner* — Raymond Alejandro
(74) *Attorney, Agent, or Firm* — Myers Sigel, P.A.

(57) ABSTRACT

The present invention relates to a method of producing a sodium iron(II)-hexacyanoferrate(II) ($Na_{2-x}Fe[Fe(CN)_6] \cdot mH_2O$, where x is <0.4) material commonly referred to as Prussian White. The method comprises the steps of acid decomposition of $Na_4Fe(CN)_6 \cdot 10H_2O$ to a powder of $Na_{2-x}Fe[Fe(CN)_6] \cdot mH_2O$, drying and enriching the sodium content in the $Na_{2-x}Fe[Fe(CN)_6] \cdot mH_2O$ powder by mixing the powder with a saturated or supersaturated solution of a reducing agent containing sodium in dry solvent under an inert gas. The steps of acid decomposition and enriching the sodium content are performed under non-hydrothermal conditions.

9 Claims, 5 Drawing Sheets

(51) Int. Cl.
    *H01M 4/587*     (2010.01)
    *H01M 10/054*     (2010.01)
    *H01M 4/58*     (2010.01)
    *C01C 3/12*     (2006.01)
    *H01M 4/02*     (2006.01)

(52) U.S. Cl.
CPC ....... *H01M 4/5825* (2013.01); *H01M 10/054* (2013.01); *C01P 2002/72* (2013.01); *C01P 2004/03* (2013.01); *C01P 2006/40* (2013.01); *H01M 2004/028* (2013.01)

(58) Field of Classification Search
CPC .... C01C 3/12; C01P 2002/72; C01P 2004/03; C01P 2006/40
See application file for complete search history.

(56) References Cited

U.S. PATENT DOCUMENTS

| | | | |
|---|---|---|---|
| 9,745,202 B2 * | 8/2017 | Song | H01M 4/58 |
| 2014/0050982 A1 * | 2/2014 | Lu | H01M 4/133 |
| | | | 429/211 |
| 2014/0370187 A1 | 12/2014 | Vail et al. | |

OTHER PUBLICATIONS

International Search Report and Written Opinion corresponding to International Application No. PCT/SE2017/050917 dated Nov. 27, 2017.

* cited by examiner ure but low pressures or in hydrothermal conditions. A number of published works exist following this method and have achieved modest sodium content, however the electrochemistry is either not ideal nor does the resulting material reflect typical behaviour of water free Prussian white. Examples of recent methods and materials are described in Y. Liu, Y. Qiao, W. Zhang, Z. Li, X. Ji, L. Miao, L. Yuan, X. Hu, Y. Huang, *Nano Energy*, 12 (2015) 386, and D. Yang, J. Xu, X.-Z. Liao, H. Wang, Y.-S. He, Z.-F. Ma, *Chem. Comm.*, 51 (2015) 8181. Goodenough et al however, have successfully produced Prussian white with high sodium content and ideal electrochemical properties, as published in L. Wang, J. Song, R. Qiao, L. A. Wray, M. A. Hossain, Y.-D. Chuang, W. Yang, Y. Lu, D. Evans, J.-J. Lee, S. Vail, X. Zhao, M. Nishijima, S. Kakimoto, J. B. Goodenough, *J. Am. Chem. Soc.*, 137 (2015) 2548. However, they achieved this via a hydrothermal reaction route which is more expensive and does not always produce pure compounds after scaling up.

METHOD OF PRODUCING A SODIUM IRON(II)-HEXACYANOFERRATE(II) MATERIAL

STATEMENT OF PRIORITY

This application is a 35 U.S.C. § 371 national phase application of PCT Application No. PCT/SE2017/050917 filed Sep. 21, 2017, which claims priority to Swedish Application No. 1651252-7 filed Sep. 22, 2016, the entire contents of each of which is incorporated by reference herein.

FIELD OF THE INVENTION

The present invention relates to a method of producing sodium iron(II)-hexacyanoferrate(II) material and devices incorporating sodium iron(II)-hexacyanoferrate(II) material. In particular the invention relates to a method of producing a high voltage and high capacity positive electrode for sodium ion batteries comprising sodium iron(II)-hexacyanoferrate(II) material.

BACKGROUND

Li-ion based batteries dominate the market for rechargeable batteries. However, the technology has drawbacks, not at least the relatively scarce resources of Li. Although better than previous generations of secondary battery technologies, the Li-ion based batteries are not environmentally friendly and costly from a recycling perspective. Sodium ion batteries represent an attractive alternative to Li-ion batteries and are arguably the most viable means of supporting renewable energy sources for the purpose of load leveling and storing excess energy. However, in order to be commercially viable materials that are both high performing and cheap to produce must be implemented.

Contrary to Li, Na has abundant natural resources in Earth's crust and sea water. The abundance of Na in the Earth's crust is about 23,000 ppm compared to 20 ppm for Li. Due to such abundance, the price of Na compounds is several times lower compared to their Li counterpart products. For example, the price of $Na_2CO_3$ is about 40 times lower than that of $Li_2CO_3$. Also, the common current collector of negative electrodes in Li-ion batteries is Cu, which could be replaced by Al in Na-ion batteries since Na does not react with Al. This is another advantage, to decrease production cost, for Na-ion batteries compared to Li-ion batteries as Al is cheaper and more abundant than Cu.

The success of a sodium ion battery technology however is heavily dependent on the sodium content of the positive electrode material, something which will prevent a given material from obtaining commercial success. Recently considerable attention has been given to a class of materials with a perovskite-like structure commonly referred to as Prussian blue analogues, due to their, at least in theory, unrivalled capacity in storing sodium ions. Focus has been to develop $Na_{2-x}Fe[Fe(CN)_6]\cdot mH_2O$ (sodium iron(II)-hexacyanoferrate (II)) with a high Na content and low $H_2O$ via the acid decomposition of $Na_4Fe(CN)_6$. The final product of such a process having a white colour is often referred to as "Prussian White". Prussian White is a Prussian Blue analogue with the chemical formula of $Na_2Fe_2(CN)_6$ and negligible water content (<0.08 $H_2O$/f.u.). Disclosed procedures typically involve the use of a reducing agent to preserve the Fe oxidation state and the use of NaCl to increase the sodium content. Syntheses typically take place under a protective atmosphere but low pressures or in hydrothermal conditions.

In addition to being used as a positive electrode in sodium ion batteries, Prussian White may also be applicable for electrochromic devices and sensors. This is because Prussian Blue has been applied in these areas and the higher sodium content of Prussian White might prove to be advantageous. These applications have been described in *Chem. Commun.*, 50 (2014) 802, and *J. Appl. Phys.* 53, (1982) 804.

SUMMARY

Recent developments in sodium ion battery technology have addressed the issue of sufficient loading capacity of Na-ions in the positive electrode. Although improved, an industrially viable method of producing Prussian white is lacking.

The object of the invention is to provide a production method and an electrode material that overcomes the drawbacks of prior art techniques. This is achieved by the method as defined in claim 1 the material as defined in claim 6 and the electrode as defined in claim 9.

Described herein is a synthesis method to produce high sodium content Prussian white $(Na_{2-y}Fe[Fe(CN)_6]\cdot mH_2O$, wherein y is preferably<0.2), which is possible to scale up and produces high quality material. The first part of the inventive method generally follows what has been described in the prior art on synthesizing the material via an acid decomposition of $Na_4Fe(CN)_6\cdot 10H_2O$ without using hydrothermal conditions. The second part of the method comprises steps to increase the sodium content such that Prussian white with electrochemical properties comparable to those reported by Goodenough et al. are achieved. These steps are performed under a protective atmosphere in dry solvent using a reducing agent in the presence of sodium ions. The resulting material is dried and can be used directly in the production of an electrode for example for the use in sodium ion batteries.

"Electrode" should in this application be given a broad interpretation as an ion source member in various electrochemical devices such as, but not limited to batteries, fuel cells, electrochromic devices, catalysts and sensors. The sodium ion battery represents an illustrating example and an important product category.

The method of producing a sodium iron(II)-hexacyanoferrate(II) material according to the invention comprises the steps of:

acid decomposition of $Na_4Fe(CN)_6\cdot 10H_2O$ to a powder of $Na_{2-x}Fe[Fe(CN)_6]\cdot mH_2O$, where x is <0.4 and m is between 0 and 10;

filtering and drying the $Na_{2-x}Fe[Fe(CN)_6]\cdot mH_2O$ powder; and enriching the sodium content in the $Na_{2-x}Fe[Fe(CN)_6]\cdot mH_2O$ powder by mixing the dried $Na_{2-x}Fe[Fe(CN)_6]\cdot mH_2O$ powder with a saturated or supersaturated solution of a reducing agent containing sodium in dry solvent under an inert gas, resulting in a $Na_{2-y}Fe[Fe(CN)_6]\cdot mH_2O$ powder, where y<x; and separating and drying the enriched $Na_{2-y}Fe[Fe(CN)_6]\cdot mH_2O$ powder resulting in the sodium iron(II)-hexacyanoferrate(II) material, The steps of acid decomposition and enriching the sodium content are performed under non-hydrothermal conditions.

The inert gas may for example be nitrogen gas ($N_2$), argon or dry air. Dry air is the cheapest option.

According to one aspect of the invention the saturated or supersaturated solution used in the enriching step comprises a sodium salt, preferably sodium iodide or sodium bromide.

According to another aspect of the invention the dry solvent in the saturated or supersaturated solution used in the enriching step is an anhydrous organic solvent, such anhydrous acetone, tetrahydrofuran (THF), propylene carbonate or acetonitrile.

According to another aspect of the invention the enriching step comprises enriching the sodium content, 2-y, to above 1.8, preferably above 1.9 or even more preferably to 1.92.

According a further aspect of the invention the method comprises forming an electrode comprising the sodium iron(II)-hexacyanoferrate(II) material, the method comprising the further steps of:

mixing the enriched, separated and dried $Na_{2-y}Fe[Fe(CN)_6]\cdot mH_2O$ powder with solvent, conductive additive and binder by milling, forming a slurry;

forming the slurry to a desired shape and removing the solvent by drying.

Provided by the present invention is a sodium iron(II)-hexacyanoferrate(II) material obtainable by the steps of:

acid decomposition of $Na_4Fe(CN)_6\cdot 10H_2O$ to a powder of $Na_{2-x}Fe[Fe(CN)_6]\cdot mH_2O$, where x is <0.4 and m is between 0 and 10;

filtering and drying the $Na_{2-x}Fe[Fe(CN)_6]\cdot mH_2O$ powder; and enriching the sodium content in the $Na_{2-x}Fe[Fe(CN)_6]\cdot mH_2O$ powder by mixing the dried $Na_{2-x}Fe[Fe(CN)_6]\cdot mH_2O$ powder with a saturated or supersaturated solution of a reducing agent containing sodium in dry solvent under an inert gas, resulting in a $Na_{2-y}Fe[Fe(CN)_6]\cdot mH_2O$ powder, where y<x; and separating and drying the enriched $Na_{2-y}Fe[Fe(CN)_6]\cdot mH_2O$ powder resulting in the sodium iron(II)-hexacyanoferrate(II) material.

The steps of acid decomposition and enriching the sodium content are performed under non-hydrothermal conditions.

FIG. 3a shows an X-ray diffraction pattern of pure rhombohedral Prussian white phase obtained by the process steps detailed above. When comparing this pattern with the pattern shown by the prior art, a difference in the crystal morphology between the Prussian white of the present disclosure and the Prussian white of the prior art. The difference in the patterns reflect that the crystallites obtained according to the present disclosure are smaller than the crystallites of the prior art. The difference is confirmed by comparing the SEM image of the Prussian white obtained according to the present disclosure shown in FIG. 4 with SEM images of prior art Prussian white. The smaller crystallite size results in higher rate capability, which means that batteries can be charged and discharged faster.

According to one aspect of the invention the sodium iron(II)-hexacyanoferrate(II) material has a sodium content of above 1.8, preferably above 1.9. The water content should preferably be negligible, i.e. <0.08 $H_2O$/f.u.

According to the invention an electrode comprising the above described sodium iron(II)-hexacyanoferrate (II) material is provided. Preferably the electrode exhibits a capacity of 130-170 mAh g$^{-1}$, such as 130-166 mAh g$^{-1}$, such as 130-155 mAh g$^{-1}$ as determined by galvanostatic cycling of multiple cells.

Thanks to the method according to the present it is possible to produce, at an industrial scale, sodium iron(II)-hexacyanoferrate(II) material ($Na_{2-x}Fe[Fe(CN)_6]\cdot mH_2O$) with a Na-content above 1.8 and with a negligible water content.

One advantage afforded by the present invention is that the method utilizes the economically attractive option of a non-hydrothermal synthesis method while still obtaining ideal electrochemical properties.

A further advantage is that the reaction is performed at essentially ambient or near-ambient conditions and as such the energy cost is minimized.

A yet further advantage is, with a view to develop the technique to synthesise materials for electrochromic or sensor applications, the sodium content in the sample can be controlled.

DESCRIPTION OF DRAWINGS

A more complete understanding of the above mentioned and other features and advantages of the present invention will be apparent from the following detailed description of preferred embodiments in conjunction with the appended drawings, wherein.

DETAILED DESCRIPTION

Figure 1:
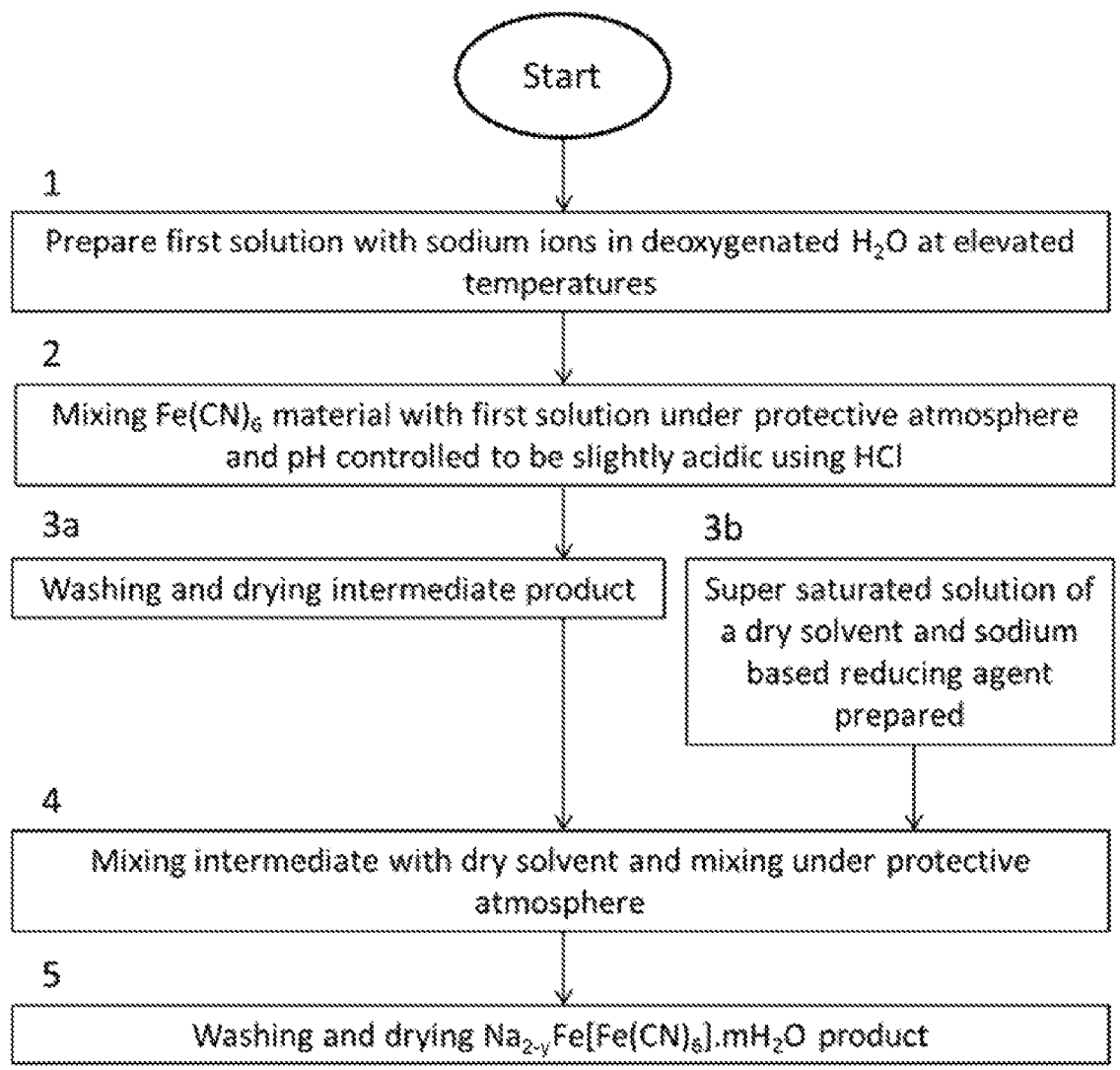
FIG. 1 is a flowchart illustrating the method according to the invention for synthesising $Na_{2-y}Fe[Fe(CN)_6]\cdot mH_2O$, wherein y is lower than x and preferably lower than 0.2.

The method according to the present invention of producing a sodium iron(II)-hexacyanoferrate(II) material, $Na_{2-y}Fe[Fe(CN)_6]\cdot mH_2O$, wherein y is below x and preferably below 0.2, comprises two stages: (A) acid decomposition of $Na_4Fe(CN)_6$ and drying to a powder material and (B) enriching the sodium content of the powder material, $Na_{2-x}Fe[Fe(CN)_6]\cdot mH_2O$ where x is <0.4. The method according to the present invention of producing a positive electrode for a sodium battery comprises a further stage (C) of forming an electrode comprising the sodium-enriched powder material.

The first stage (A) of the method according to the invention comprises acid decomposition of $Na_4Fe(CN)_6\cdot 10H_2O$, which is known in the art. However, a significant aspect is that the chemical reaction occurring during the method according to the invention is performed below 100° C. and at, or near, ambient pressure. The reaction begins with the acid decomposition, for example using HCl, of $Na_4$ Fe(CN)$_6$.10H$_2$O in deoxygenated H$_2$O at between 40-100° C. and in the presence of a saturated solution of sodium ions. As appreciated by the skilled person, other acids may be utilized. The reaction is kept under an inert gas, e.g. N$_2$, and left for some time (generally 12-36 hrs). Inert gas should be interpreted as a gas, or gas mixture, that does not react with the used substances. The reaction mixture was then cooled to room temperature (RT) and filtered in air. The residue was rinsed with deionised water and ethanol. The resulting powder, Na$_{2-x}$Fe[Fe(CN)$_6$].mH$_2$O, is then dried at 100-120° C. under vacuum overnight.

The stage of increasing the sodium content (B) makes it possible to omit the hydrothermal synthesis utilized in prior methods. The dried sodium iron(II)-hexacyanoferrate(II) powder is mixed with a solution of a reducing agent containing sodium in dry solvent under an inert gas for several days. If complete sodiation is desired then a saturated solution of the reducing agent should be employed. A preferred sodiation agent is sodium iodide, NaI. Alternatively other sodium containing reducing agents are suitable, for example NaBr. A preferred dry solvent is anhydrous acetonitrile, however anhydrous methanol or anhydrous acetone could also be used. The resulting Prussian White powder was separated by centrifugation and decanting the solvent under inert atmosphere and washed with dry solvent (for example anhydrous acetonitrile) and can be readily used directly in the production of electrodes for sodium ion batteries.

The third stage (C) comprises forming of an electrode comprising the Prussian white powder. Electrodes are be prepared by conventional slurry casting where the Prussian white material is mixed with conductive additive, binder and solvent in a ball mill. The slurry is then deposited onto a current collector; the film thickness is controlled by the doctor blade technique. One or more electrodes comprising Prussian white are arranged in a battery cell and will form high voltage and high capacity positive electrode(s).

Devices similar to the above described electrode, for example fuel cell electrodes could advantageously comprise Prussian white produced by the method according to the invention.

Prussian white powder could advantageously be utilized also in electrochromic devices and sensors.

The method according to invention will be described in detail with references to the flow chart of FIG. 1. As realized by the skilled person, the processing times and temperatures in the individual steps should be seen as non-limiting guidance. The skilled person, given the information of the essential steps of the method, will be able to adapt the process, to the present conditions and requirements, for example reaction vessel sizes, heating capabilities etc.

1) A specific volume of water is deoxygenated by bubbling N$_2$ gas through it for an hour. This solution was then saturated with NaCl. The entire reaction vessel is kept under flowing N$_2$.

2) To the saturated solution a given quantity (dependent on the desired yield) of Na$_4$Fe(CN)$_6$.10H$_2$O was added and allowed to dissolve. HCl is then added to the solution to control the pH to be less than 6.5. The reaction vessel is heated to a temperature of 40-100° C. and allowed to react for a period of time between 12 and 24 hrs.

3) a. The resulting powder is separated and washed. Preferably the powder is separated by filtering in air and washed with deionised, deoxygenated water and then ethanol. Alternatively, the resulting powder can be separated by centrifugation, decanting the solution and then washing with water and ethanol followed by further centrifugation and decanting. Also other commonly used separation and washing methods can be utilized b. A concentrated solution of reducing NaX is produced in anhydrous acetonitrile under an inert atmosphere of Ar or N$_2$.

4) The powder is added to the dry solvent and allowed to stir under a dry inert atmosphere of Ar or N$_2$ until a white powder is obtained, Prussian white (Na$_{2-y}$Fe[Fe(CN)$_6$].mH$_2$O) with a Na-content above 1.8 (i.e. y is below 0.2) and with a negligible water content.

5) The resulting Na$_{2-y}$Fe[Fe(CN)$_6$].mH$_2$O powder is separated from the dry solvent and washed with additional dry solvent typically 3-4 times under an inert atmosphere. The resulting powder is dried again at a moderate temperature, for example 120° C. for 12 hrs.

The so produced Prussian white material may be formed into an electrode by the additional steps of:

6) The dried Prussian white powder is mixed with solvent, conductive additive and binder by milling, for example ball milling, under inert atmosphere for about 1 hrs.

7) Forming the resulting slurry to the desired shape. For example by applying the resulting slurry is to a metal foil and evenly distributed by a doctor blade. The solvent is removed from the electrodes by drying at 120° C. for 12 hrs. Alternatively various casting or pressing procedures may be used.

EXAMPLES/RESULTS

Using the above described synthesis method Prussian white can be synthesized via a method that uses similar reagents without the need for the expensive hydrothermal synthesis procedures. Evidence that Prussian white is synthesized is shown in both the X-ray diffraction pattern (FIG. 3$a$-$b$) and the characteristic voltage profiles (FIG. 2$a$-$b$), both of which are similar to the material produced via the hydrothermal synthesis method in the prior art. The voltage profiles were measured with the standard method galvanostatic cycling using a Digatron BTS from Digatron Power Electronics. The galvanostatic cycling of multiple cells was performed between 2 & 4.2 Volts at a current of 11.5 mA*g$^{-1}$. X-ray diffraction patterns were obtained by measurement of samples sealed in borosilicate glass capillaries, the instrument was a STOE-STADI P diffractometer with a Mythen Dectris 1K strip detector with a 0.15° angular resolution. Samples were measured between 10-60° two-theta and the X-ray source used was a single wavelength Cu K$\alpha$1.

Figure 2A:
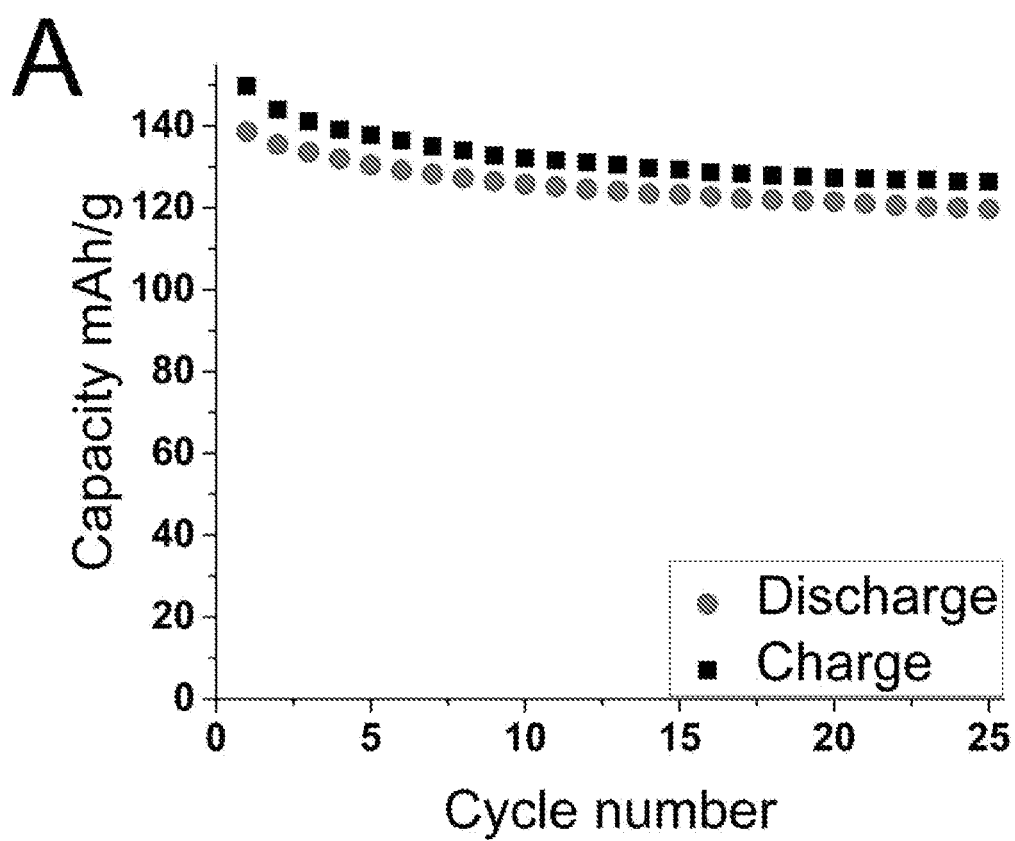
FIG. 2a-b are graphs representing the electrochemical behavior of $Na_{2-y}Fe[Fe(CN)_6]\cdot mH_2O$ synthesised via the modified acid decomposition synthesis procedure.
Figure 2B:
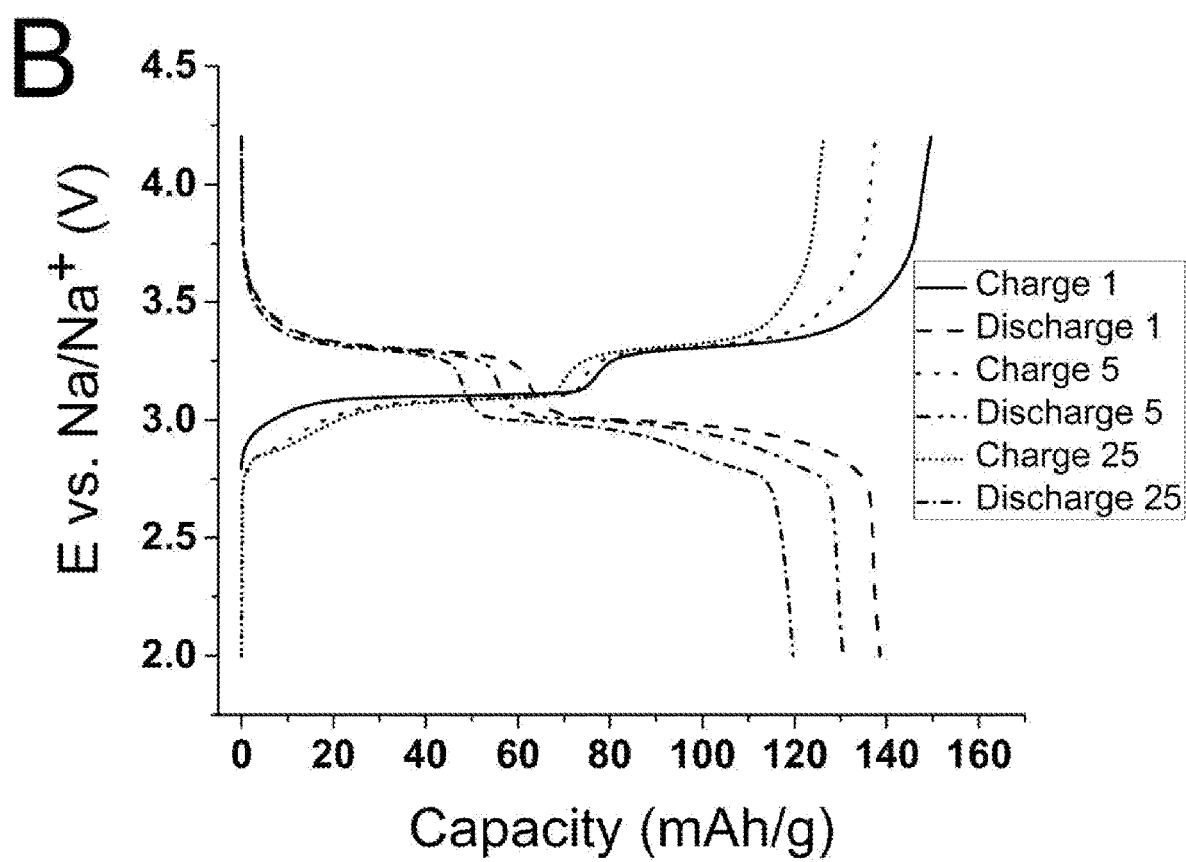
Figure 3A:
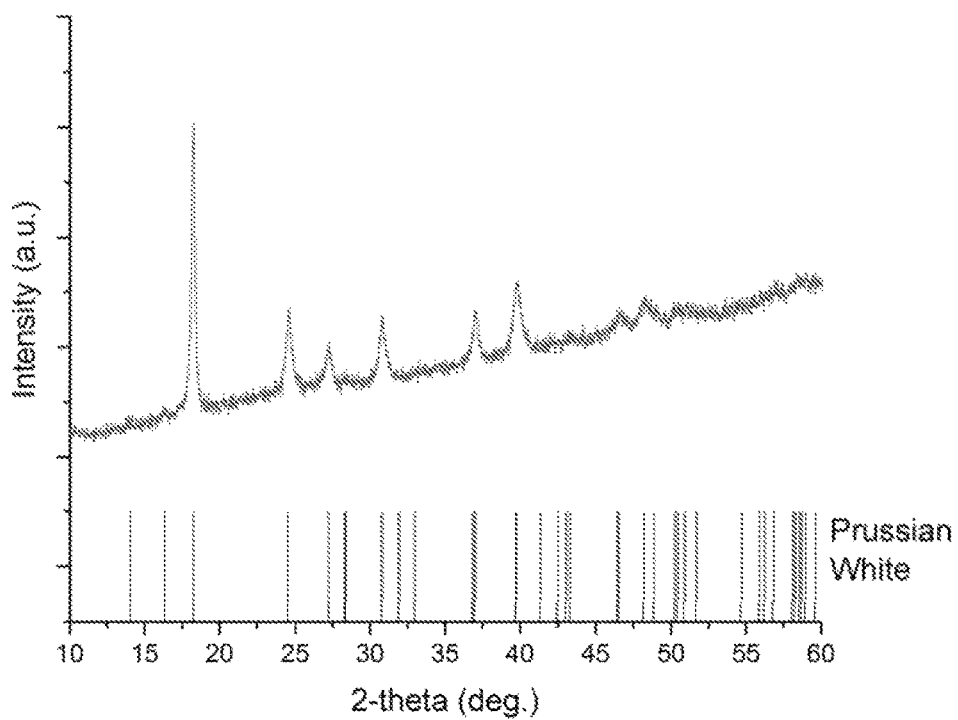
FIG. 3a-b are X-ray diffraction patterns of: (a) the pure rhombohedral Prussian white phase and a comparison with Prussian blue (b).
Figure 3B:
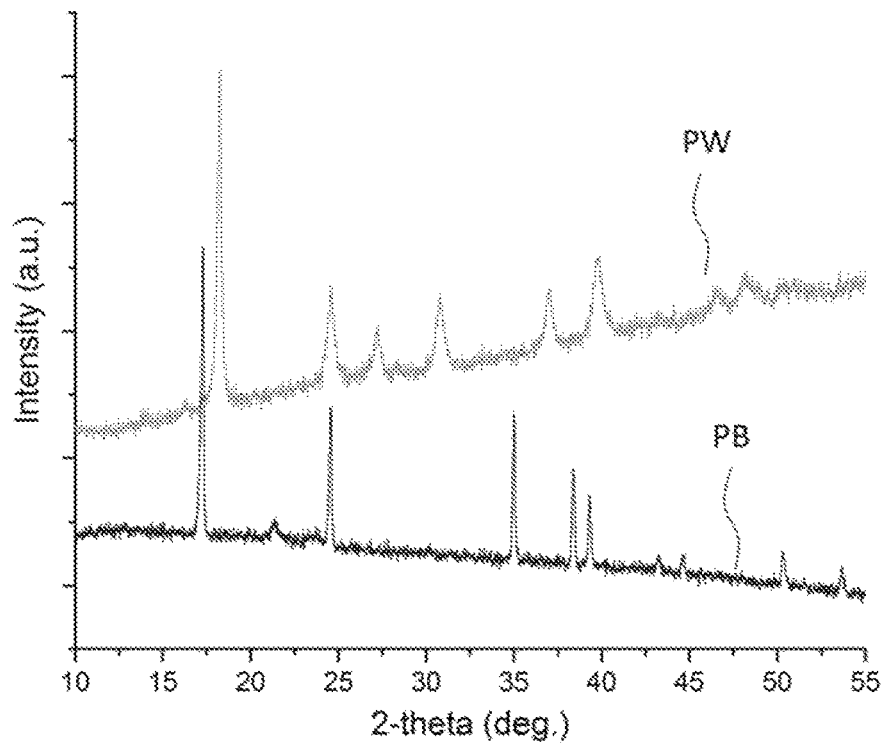
Figure 4:
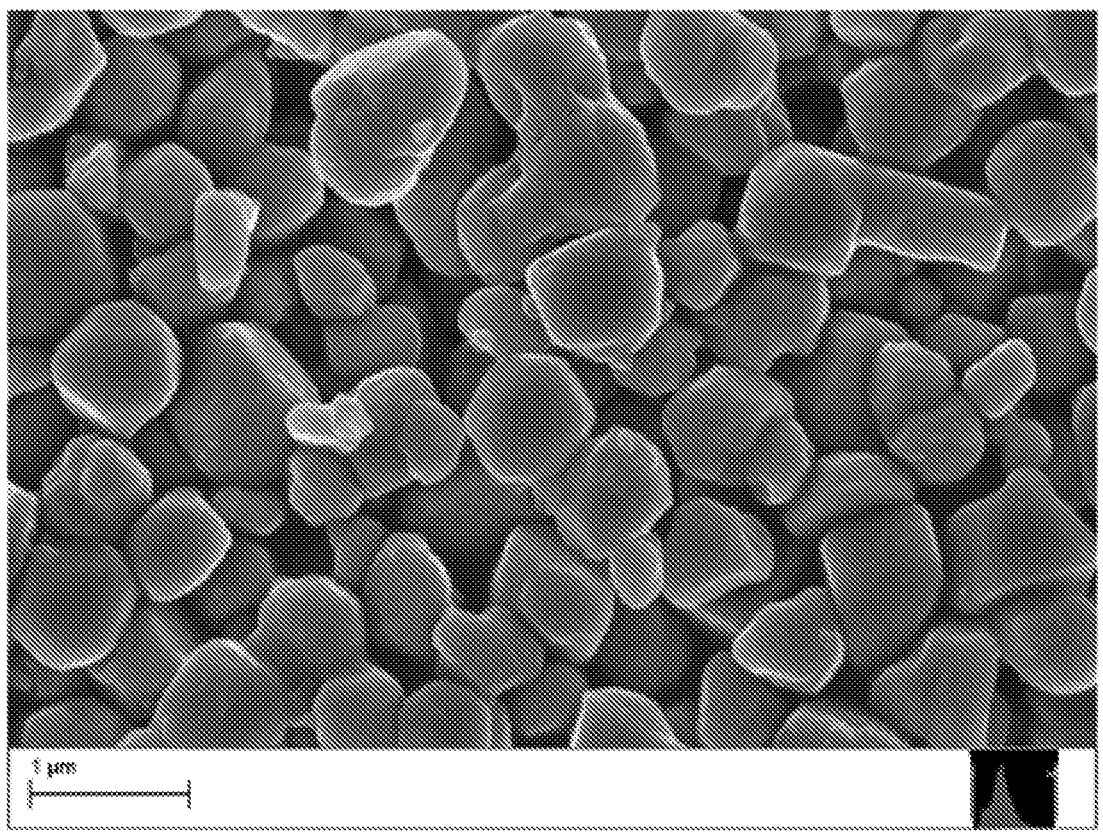
FIG. 4 is a SEM image of Prussian white obtained according to the present disclosure (EHT=5.00 kV; WD=8.7 mm; Signal A=InLens; Mag=43.60 K X; I Probe=30 pA).

The X-ray diffraction pattern is distinctly Prussian White and not Prussian Blue because these two materials have different crystal structures. Specifically, Prussian Blue's crystal structure has cubic symmetry (space group Fm-3m) while Prussian White exhibits rhombohedral symmetry (space group R-3m). This symmetry difference produces a different characteristic diffraction pattern (FIG. 3$b$). Additionally, the two voltage plateaus have only ever been observed for Prussian White. As seen in FIG. 2$a$ a stable capacity of 130-140 mAh g$^{-1}$ is achieved for the material according to the invention.

The invention claimed is:

1. A method of producing a sodium iron(II)-hexacyanoferrate(II) material, $Na_{2-x}Fe[Fe(CN)_6].mH_2O$, where x is <0.4, the method comprising the steps of:
   acid decomposition of $Na_4Fe(CN)_6.10H_2O$ to a powder of $Na_{2-x}Fe[Fe(CN)_6].mH_2O$, where x is <0.4 and m is between 0 and 10;
   filtering and drying the $Na_{2-x}Fe[Fe(CN)_6].mH_2O$ powder; and
   enriching the sodium content in the $Na_{2-x}Fe[Fe(CN)_6].mH_2O$ powder, resulting in a $Na_{2-y}Fe[Fe(CN)_6].mH_2O$ powder, where y<x;
   separating and drying the enriched $Na_{2-y}Fe[Fe(CN)_6].mH_2O$ powder resulting in the sodium iron(II)-hexacyanoferrate(II) material,
   wherein the steps of acid decomposition and enriching the sodium content are performed under non-hydrothermal conditions, and in that the step of enriching the sodium content comprises mixing the dried $Na_{2-x}Fe[Fe(CN)_6].mH_2O$ powder with a saturated or supersaturated solution of a reducing agent containing sodium in dry solvent under an inert gas.

2. The method according to claim 1, wherein the saturated or supersaturated solution comprises a sodium salt.

3. The method according to claim 1, wherein the dry solvent in the saturated or supersaturated solution is anhydrous organic solvent.

4. The method according to claim 1, wherein the enriching step comprises enriching the sodium content, 2-y, to above 1.8.

5. The method according to claim 1, wherein an electrode comprising the sodium iron(II)-hexacyanoferrate(II) material is formed, the method comprising the further steps of:
   mixing the enriched, separated and dried $Na_{2-y}Fe[Fe(CN)_6].mH_2O$ powder with solvent, conductive additive and binder by milling, forming a slurry;
   forming the slurry to a desired shape and removing the solvent by drying.

6. The method according to claim 2, wherein the sodium salt is sodium iodide or sodium bromide.

7. The method according to claim 3, wherein the anhydrous organic solvent is anhydrous acetone, tetrahydrofuran (THF), propylene carbonate, or acetonitrile.

8. The method according to claim 4, wherein the enriching step comprises enriching the sodium content, 2-y, to above 1.9.

9. The method according to claim 4, wherein the enriching step comprises enriching the sodium content, 2-y, to 1.92.

* * * * *

UNITED STATES PATENT AND TRADEMARK OFFICE
CERTIFICATE OF CORRECTION

Page 1 of 1

PATENT NO. : 10,899,632 B2
APPLICATION NO. : 16/332982
DATED : January 26, 2021
INVENTOR(S) : Brant et al.

It is certified that error appears in the above-identified patent and that said Letters Patent is hereby corrected as shown below:

On the Title Page

Item (30) Foreign Application Priority Data:
Please correct "1651252" to read -- 1651252-7 --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*